(12) United States Patent
Schell et al.

(10) Patent No.: US 7,721,540 B2
(45) Date of Patent: May 25, 2010

(54) ENGINE SYSTEM ROUTING CRANKCASE GASES INTO EXHAUST

(75) Inventors: William Lyle Schell, Morton, IL (US); Paul Frederick Olsen, Chillicothe, IL (US); Christopher Ronald Gehrke, Chillicothe, IL (US); Joshua David Keyes, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 270 days.

(21) Appl. No.: 11/898,714

(22) Filed: Sep. 14, 2007

(65) Prior Publication Data

US 2009/0071451 A1 Mar. 19, 2009

(51) Int. Cl.
F02D 23/00 (2006.01)
F01N 5/04 (2006.01)
(52) U.S. Cl. .............................. 60/602; 60/283; 60/280; 123/572; 123/573; 123/574
(58) Field of Classification Search .................... 60/602, 60/283, 280; 123/572–574
See application file for complete search history.

(56) References Cited

U.S. PATENT DOCUMENTS

| | | | |
|---|---|---|---|
| 5,205,265 A * | 4/1993 | Kashiyama et al. | 123/572 |
| 5,937,837 A * | 8/1999 | Shaffer et al. | 123/573 |
| 6,418,719 B2 | 7/2002 | Terry et al. | |
| 6,439,174 B1 | 8/2002 | Shea et al. | |
| 6,588,201 B2 | 7/2003 | Gillespie | |
| 6,708,104 B2 * | 3/2004 | Avery et al. | 701/110 |
| 6,851,415 B2 | 2/2005 | Mahakul et al. | |
| 6,892,715 B2 | 5/2005 | Norrick | |
| 7,137,778 B2 | 11/2006 | Marcis et al. | |
| 7,159,386 B2 | 1/2007 | Opris | |
| 7,204,241 B2 | 4/2007 | Thompson et al. | |
| 7,320,316 B2 * | 1/2008 | Moncelle et al. | 123/572 |
| 7,434,571 B2 * | 10/2008 | Moncelle et al. | 123/572 |
| 2003/0106543 A1 | 6/2003 | Gschwindt et al. | |
| 2006/0045764 A1 | 3/2006 | Thompson et al. | |
| 2007/0084194 A1 | 4/2007 | Holm | |
| 2007/0107709 A1 | 5/2007 | Moncelle et al. | |

* cited by examiner

*Primary Examiner*—Thomas E Denion
*Assistant Examiner*—Mary A Davis
(74) *Attorney, Agent, or Firm*—Finnegan, Henderson, Farabow, Garrett & Dunner

(57) ABSTRACT

An engine system is disclosed. The engine system has an engine block having at least one combustion chamber and at least partially defining a crankcase. The engine system also has an inlet conduit connecting a compressor of a turbocharger with the at least one combustion chamber. The engine system further has an exhaust conduit connecting a turbine of the turbocharger with the combustion chamber and a ventilation conduit connecting the crankcase with the exhaust conduit. The engine system also has a controller in communication with the turbocharger, the controller being configured to adjust the geometry of the turbocharger to maintain a pressure of the crankcase lower than a pressure of the inlet conduit.

19 Claims, 1 Drawing Sheet

ENGINE SYSTEM ROUTING CRANKCASE GASES INTO EXHAUST

TECHNICAL FIELD

The present disclosure is directed to a control system for an internal combustion engine and, more particularly, to an engine system that routes crankcase gases into the engine's exhaust.

BACKGROUND

A fuel and air mixture is combusted within cylinders of an internal combustion engine. Reciprocating pistons are moved between top dead center and bottom dead center positions within the cylinders by a crankshaft situated in a crankcase of the engine. As each piston moves toward its top dead center position, it compresses the fuel and air mixture. When the compressed mixture combusts, it expands and drives the piston downward toward its bottom dead center position. Combustion within the cylinder releases energy and generates combustion products and by-products, most of which are exhausted from the cylinder into an exhaust system of the engine during the exhaust phase of the combustion cycle. However, some of the combustion products and/or by-products enter into the crankcase by blowing past seal rings around the pistons, and are thus termed "blow-by gases" or simply "blow-by."

Blow-by gases contain contaminants normally found in the engine's exhaust such as, for example, hydrocarbons (HC), carbon monoxide (CO), oxides of nitrogen ($NO_x$), soot, and unburned or partially burned fuel. In addition, because the crankcase is partially filled with lubricating oil being agitated at high temperatures, the blow-by gases may mix with and entrain oil droplets and oil vapor.

As blow-by gases build up in the crankcase, they must be vented to relieve pressure in the crankcase. Some systems vent the blow-by gases directly to the atmosphere. However, the contaminants in blow-by gases may be harmful to the environment. Therefore, emissions concerns make direct atmospheric venting a poor option under most, if not all, operating conditions. To minimize the negative effects on the environment, engine manufacturers have routed crankcase emissions to either the engine intake or to the exhaust line upstream of emission control devices. The result was a new emissions flow path.

Problems arose in routing crankcase emissions to the exhaust line. In some instances, there is a pressure imbalance between the intake system, the exhaust system, and the crankcase. Instead of the crankcase emissions venting through the exhaust system to the tailpipe, the pressure imbalance causes oil and exhaust to flow back into the engine via the crankcase. This blowby of the exhaust/air mixture into the engine cylinder can negatively work against piston movement.

One method that has been implemented by engine manufacturers to prevent an improper balance of exhaust versus crankcase pressures is described by U.S. Patent Application Publication 2007/0084194 (the '194 publication) by Holm, published on Apr. 19, 2007. The '194 publication discloses a crankcase ventilation system including an exhaust gas conduit through which exhaust gas flows from an engine, and a crankcase emissions conduit through which crankcase emissions flow from the engine. The exhaust gas conduit includes a crankcase emissions inlet through which the crankcase emissions flow from the crankcase emissions conduit into the exhaust gas conduit. The exhaust gas conduit includes a reduced portion having a minimum inner diameter, the minimum inner diameter being located downstream of the crankcase emissions inlet for drawing the crankcase emissions through the inner diameter. In this manner, the system of the '194 publication eliminates the pressure imbalance between the exhaust system and the crankcase for certain pre-determined conditions.

Although the system of the '194 publication may be adequate for some situations, it may have limited applicability. Specifically, the reduced portion provides a constant pressure drop in the exhaust conduit. As such, the system of the '194 publication may be unable to adjust to varying pressure conditions between the crankcase and exhaust system. This lack of versatility may render the system of the '194 publication unable to adjust to a variety of pressure conditions, thereby increasing the likelihood of improper engine operation.

The present disclosure is directed to overcoming one or more of the problems set forth above.

SUMMARY OF THE INVENTION

In one aspect, the present disclosure is directed to an engine system. The engine system includes an engine block having at least one combustion chamber and at least partially defining a crankcase. The engine system also includes an inlet conduit connecting a compressor of a turbocharger with the at least one combustion chamber. The engine system further includes an exhaust conduit connecting a turbine of the turbocharger with the combustion chamber, and a ventilation conduit connecting the crankcase with the exhaust conduit. The engine system also includes a controller in communication with the turbocharger. The controller is configured to adjust the geometry of the turbocharger to maintain a pressure of the crankcase lower than a pressure of the inlet conduit.

In another aspect, the present disclosure is directed toward a method for controlling engine emissions. The method includes directing air and fuel into an engine, combusting fuel within the engine to produce power and a flow of exhaust, and releasing exhaust from the engine to the atmosphere. The method also includes venting gases from a crankcase of the engine to mix with the exhaust, and increasing a pressure of the air directed into the engine when a pressure of the vented gases is within an amount of the inlet air pressure.

DETAILED DESCRIPTION

Figure 1:
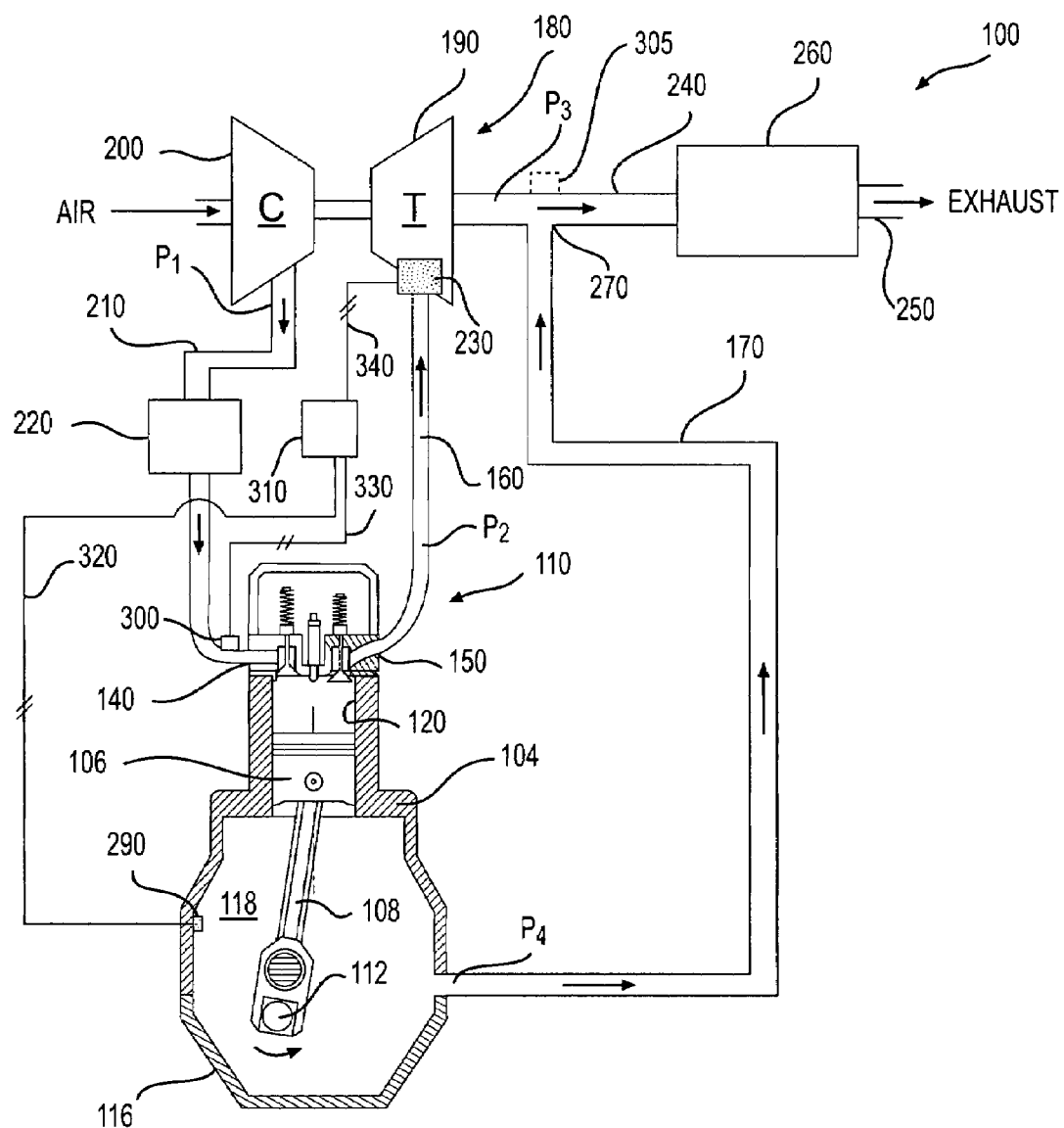
FIG. 1 is a schematic illustration of an exemplary disclosed engine system.

FIG. 1 illustrates an exemplary embodiment of an engine 110 having an emissions system 100. Engine 110 may be any kind of engine, such as a gasoline engine, a diesel engine, or a gaseous-fuel powered engine. Engine 110 may include an intake system configured to direct air and/or fuel into a plurality of cylinders 120 (only one shown) of engine 110, and an exhaust system configured to direct combustion by-products from cylinders 120 to the atmosphere. Engine 110 may be naturally aspirated or may include forced induction via turbocharging or supercharging.

Engine 110 may include an engine block 104 that at least partially defines cylinders 120. Engine 110 may also include a piston 106 slidably disposed within each cylinder 120, and a crankshaft 112 that is rotatably supported within engine block 104 by way of a plurality of journal bearings (not shown). A connecting rod 108 may connect each piston 106 to crankshaft 112 so that a sliding motion of piston 106 within each respective cylinder 120 results in a rotation of crankshaft 112. An oil pan 116 may be connected to engine block 104 to form a cavity known as a crankcase 118 located below cylinders 120. Lubricant may be provided from oil pan 116 to engine surfaces to minimize metal-on-metal contact and prevent damage to the surfaces. Oil pan 116 may serve as a sump for collecting and supplying this lubricant.

The intake system may include a compressor 200 driven by a turbine 190. Compressor 200 may operate to compress ambient air to a pressure $P_1$ and deliver the compressed air to an air intake 140 of engine 110 through a conduit 210. This delivery of compressed air may help to overcome a natural limitation of combustion engines by eliminating an area of low pressure within cylinders 120 created by a downward stroke of pistons 106. Therefore, compressor 200 may increase the volumetric efficiency within cylinder 120, and this efficiency may allow more fuel to be burned, resulting in a larger power output from engine 110. Conduit 210 may include a cooler 220. Cooler 220 may serve to cool gases in conduit 210, which may increase the density of the gases and thereby further increase the amount of air supplied to engine 110.

The exhaust system may include a first exhaust conduit 160, connecting an exhaust manifold 150 of engine 110 to turbine 190. Turbine 190 may receive exhaust gases from engine 110 through first exhaust conduit 160, causing turbine 190 to rotate. As described above, the rotation of turbine 190 may drive compressor 200, turbine 190 together with compressor 200 forming a turbocharger 180.

A second exhaust conduit 240 may connect turbine 190 to a filter assembly 260. Filter assembly 260 may include any suitable filtration media, absorber, reducer, and/or catalytic converter known in the art for reducing the toxicity of emissions. An exhaust outlet 250 may connect filter assembly 260 to the atmosphere.

As engine 110 operates, pressure may build in crankcase 118. A crankcase ventilation conduit 170 may vent crankcase gases to the exhaust system, thereby helping to prevent excessive pressures in crankcase 118. Crankcase ventilation conduit 170 may connect crankcase 118 of engine 110 to a crankcase ventilation inlet 270 of second exhaust conduit 240. Crankcase ventilation inlet 270 may serve to merge the flow of gases from crankcase ventilation conduit 170 and second exhaust conduit 240. Crankcase ventilation inlet 270 may be located downstream of turbocharger 180, but upstream of filter assembly 260 such that gases from crankcase 118 may pass through filter assembly 260. The gases within crankcase ventilation inlet 270 may have a pressure $P_3$.

Turbine 190 may be a variable geometry turbine and include an arrangement 230 of variable position vanes or a movable nozzle ring. As the vanes move or as the ring is rotated, the effective area between adjacent tips of the vanes may change, thereby altering the geometry and flow characteristics of the housing of turbine 190. Altering the geometry of turbine 190 may directly affect a pressure $P_2$ of fluids in first exhaust conduit 160, causing turbine 190 to rotate at a faster or slower speed. The rotation of turbine 190 may drive compressor 200 to deliver air to air intake 140. Therefore, varying the geometry of turbocharger 180 may also affect inlet or boot pressure $P_1$ of engine 110.

Emissions system 100 may also include a control system. The control system may include a first pressure sensor 290, located at crankcase 118 of engine 110. First pressure sensor 290 may serve to measure a pressure $P_4$ of crankcase 118 and crankcase ventilation conduit 170. In an alternative embodiment (not shown), first pressure sensor 290 may be located within ventilation conduit 170. The control system may also include a second pressure sensor 300 located at air intake 140. Second pressure sensor 300 may serve to measure a pressure $P_1$ corresponding to the pressure of conduit 210. An electrical line 320 may connect first pressure sensor 290 to a controller 310, and an electrical line 330 may connect second pressure sensor 300 to controller 310. An electrical line 340 may connect controller 310 to arrangement 230 of variable position vanes of variable geometry turbine 190. In an alternative embodiment, a third pressure sensor 305 in communication with controller 310 may be located within second exhaust conduit 240 to measure the pressure $P_3$ of gases exiting turbine 190.

Controller 310 may be any type of programmable logic controller known in the art for automating machine processes, such as a switch, a process logic controller, or a digital circuit. Controller 310 may be made from any material known in the art for logic control devices, and may include a protective housing of metal, plastic, or another durable material. Controller 310 may include input/output arrangements that allow it to be connected to sensors 290 and 300, and to turbocharger 180. Controller 310 may be connected to additional engine parameter sensors (not shown), such as sensors for measuring ignition timing, compression, and engine temperature, if desired.

Controller 310 may be reactive to measurements from first pressure sensor 290, second pressure sensor 300, and the additional engine parameter sensors to control variable geometry turbocharger 180. Controller 310 may use proportional and integral control responses in controlling turbocharger 180, which attempt to correct error between a measured variable and the desired value of that variable through an algorithm. The proportional value may calculate the reaction to a given error and the integral value may calculate the reaction based on a sum of a number of recent errors. Using this analysis of the error, controller 310 may perform more precise trial and error adjustments to efficiently "close in" on the desired value. Accordingly, controller 310 may use this iterative proportional and integral control response to adjust the vanes of variable geometry turbocharger 180 to produce a desired pressure $P_1$ based on the measured pressure $P_4$.

Controller 310 may also use proportional, integral, and derivative control responses in controlling turbocharger 180. The procedure is the same as described above, except that a derivative step may be added. The derivative value considers the rate of change of the error, which may contribute to controller 310 causing the vanes of turbocharger 180 to achieve the desired pressure $P_1$ based on the measured pressure $P_4$.

The basic function of controller 310 may be to modify the operation of turbine 190 through a series of programmed algorithms. Controller 310 may receive measured values of $P_1$ and $P_4$, and then compare the values to an engine map that may be stored in the memory of controller 310. The engine map may contain numerous scenarios of engine performance for possible ranges of values of engine parameters (e.g. engine load, engine speed, and throttle position). The engine map may contain threshold differences between $P_1$ and $P_4$ that are considered acceptable (i.e. ensuring that pressure $P_1$ may remain greater than pressure $P_4$ by an acceptable margin). If the values of $P_1$ and $P_4$ are not within acceptable tolerances, controller 310 may send an output to turbine 190 for adjusting arrangement 230, thereby varying pressure $P_2$, the rotation speed of turbine 190, and the pressure $P_1$ caused by compressor 200, as described above. Controller 310 may make this indirect adjustment of $P_1$ through turbine 190 until achieving the acceptable conditions defined by the engine map. In an alternative embodiment, controller 310 may complete the same operation for comparing measured values of pressures $P_2$ and $P_3$ to acceptable thresholds of the engine map. By ensuring that the pressures are within acceptable thresholds, controller 310 may ensure adequate venting of crankcase 118 by preventing the blow-by caused when pressure $P_4$ exceeds pressure $P_1$. In an additional alternative embodiment, the geometry of compressor 200 may be variable instead of (or in addition to) the geometry of turbine 190 being variable. In this alternative embodiment, controller 310 may adjust the geometry of turbine 190 and/or compressor 200.

In an additional alternative embodiment, engine 110 may also include a recirculation system that connects the exhaust system to the intake system. The recirculation system may include a recirculation conduit (not shown) connecting second exhaust conduit 240 to compressor 200. The recirculation conduit may include a cooler (not shown), similar to cooler 220. The recirculation system may serve to direct exhaust gases from engine 110 back into engine 110 for subsequent combustion. The recycling of exhaust gases may help reduce the production of $NO_x$. In this embodiment, controller 310 may function to maintain the pressure of the combined air and recirculated exhaust above the crankcase pressure.

INDUSTRIAL APPLICABILITY

The disclosed engine system may help to avoid improper engine operation by preventing a pressure imbalance between the crankcase and engine cylinders under varying conditions. The engine system may adjust the pressure in the engine cylinders to react to various pressure differences between the crankcase and the engine. By maintaining an adequate pressure difference, the engine system may avoid blowby gases from the crankcase and the resulting disruption of engine operation. Since the engine system may be capable of varying the pressure difference, it may avoid improper engine operation over a wide range of conditions.

During operation of engine 110, pistons 106 may reciprocate within cylinder 120 to produce a rotation of crankshaft 112. During this operation, engine 110 may produce and release exhaust through first exhaust conduit 160 at pressure $P_2$. Pressure $P_2$ of the exhaust in first exhaust conduit 160 may force turbine 190 to rotate. After passing through turbine 190, the exhaust may pass through second exhaust conduit 240, filter assembly 260, and exhaust outlet 250 into the atmosphere. The rotation of turbine 190 may drive compressor 200, which delivers compressed ambient air through conduit 210 into cylinder 120 of engine 110. Compressor 200 may deliver air to engine 110 at pressure $P_1$.

As engine 110 operates, gases in crankcase 118 may build to pressure $P_4$. Crankcase gases may escape from crankcase 118 through crankcase ventilation conduit 170. The crankcase gases in ventilation conduit 170 may also be at about pressure $P_4$. The gases may pass out of crankcase ventilation conduit 170 and into second exhaust conduit 240 via crankcase ventilation inlet 270, where the crankcase gases may mix with the engine exhaust. The pressure of the mixture of exhaust and crankcase gases may be $P_3$. The crankcase gases may pass through filter assembly 260, exhaust outlet 250, and into the atmosphere.

As engine 110 and turbocharger 180 are operating as described above, the control system may simultaneously make adjustments to arrangement 230 of variable geometry turbine 190. Sensor 300 may continuously measure pressure $P_1$ and relay the measurement as an input signal to controller 310 via electrical line 330. Sensor 290 may continuously measure pressure $P_4$ and relay the measurement as an input signal to controller 310 via electrical line 320. As controller 310 receives the measured values of $P_1$ and $P_4$, it may compare the values to each other and/or to the values of the engine map stored in its memory. If the difference between $P_1$ and $P_4$ are within the acceptable threshold difference set by the engine map (i.e. pressure $P_1$ exceeds pressure $P_4$ by an acceptable margin which may be dependent on engine operation, for example speed or load), controller 310 may not make any adjustment to arrangement 230. However, if this difference is not within the acceptable threshold, controller 310 may make some adjustment to arrangement 230 of turbine 190 through output sent via electrical line 340.

Controller 310 may send output to adjust the vane or ring positions of arrangement 230 to alter the geometry of turbine 190. Altering the geometry of turbine 190 may change pressure $P_2$ of the first exhaust conduit 160, causing turbine 190 to rotate at either a faster or slower speed. The rotation of turbine 190 may drive compressor 200 to deliver air to air intake 140 at an adjusted pressure $P_1$. Sensors 300 and 290 may send updated input signals of measured pressures $P_1$ and $P_4$ to controller 310. Controller 310 may compare the new values to the acceptable threshold differences stored in the engine map in its memory. This procedure may continue until the values of $P_1$ and $P_4$ are within the acceptable threshold difference set by the engine map. Controller 310 may also perform the above procedure based on measurements provided to controller 310 by third pressure sensor 305 located in second exhaust conduit 240.

The disclosed engine system may help to prevent a pressure imbalance between crankcase 118 and cylinders 120 under varying conditions. The engine system may directly and indirectly adjust pressures in engine 110 to ensure that blowby gases do not enter cylinder 120 of engine 110 for various pressure conditions and disrupt operation of engine 110. Since the engine system is capable of sensing and reacting to variable pressures, it may avoid improper engine operation over a wide range of conditions.

It will be apparent to those skilled in the art that various modifications and variations can be made to the disclosed emissions system. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. An engine system, comprising:
    an engine block having at least one combustion chamber and at least partially defining a crankcase;
    an inlet conduit connecting a compressor of a turbocharger with the at least one combustion chamber;
    an exhaust conduit connecting a turbine of the turbocharger with the combustion chamber;
    a ventilation conduit connecting the crankcase with the exhaust conduit; and
    a controller in communication with the turbocharger, the controller being configured to adjust a geometry of the turbocharger to maintain a pressure of the crankcase lower than a pressure of the inlet conduit.

2. The engine system of claim 1, further including:
    a first sensor located to generate a first signal indicative of the crankcase pressure; and
    a second sensor located to generate a second signal indicative of the inlet conduit pressure, wherein the controller is in communication with the first and second sensors to receive the first and second signals.

3. The engine system of claim 2, wherein the first sensor is located in the crankcase.

4. The engine system of claim 2, wherein the first sensor is located in the ventilation conduit.

5. The engine system of claim 2, further including a third sensor located within the exhaust conduit to generate a third signal indicative of the exhaust conduit pressure, where the controller is in communication with the third sensor to receive the third signal.

6. The engine system of claim 5, wherein the controller varies the geometry of the turbocharger in response to the first and third signals.

7. The engine system of claim 2, further including a cooler located within the inlet conduit, where the second pressure sensor is located downstream of the cooler.

8. The engine system of claim 2, wherein the controller adjusts the geometry of the turbocharger when the difference between the first and second signals is greater than a threshold value.

9. The engine system of claim 8, wherein the threshold value is contained in an engine map stored in a memory of the controller.

10. The engine system of claim 9, wherein the threshold value changes when an engine parameter changes.

11. The engine system of claim 10, wherein the engine parameter is engine speed.

12. The engine system of claim 1, further including a filter located within the exhaust conduit, where the filter is located downstream of the ventilation conduit.

13. The engine system of claim 1, wherein the turbocharger is a variable geometry turbocharger and includes a variable geometry turbine.

14. A method for operating an engine, comprising:
    directing air and fuel into an engine;
    combusting the fuel within the engine to produce power and a flow of exhaust, the combusting of the fuel within the engine causing combustion gases to enter into a crankcase of the engine;
    releasing the flow of exhaust from the engine to a turbocharger through an exhaust conduit;
    venting the combustion gases from a the crankcase to an crankcase ventilation conduit, the crankcase ventilation conduit being connected to the exhaust conduit downstream of the turbocharger, the combustion gases from the crankcase mixing with the flow of exhaust in the exhaust conduit before releasing to the atmosphere;
    sensing a pressure of the vented combustion gases in the crankcase ventilation conduit; and
    adjusting a pressure of the air directed into the engine to be greater than the sensed pressure of the vented combustion gases, wherein adjusting the pressure of the air directed into the engine includes modifying a geometry of the turbocharger of the engine.

15. The method of claim 14, wherein the geometry of the turbocharger is adjusted when a difference between the sensed pressure of the vented combustion gases and a sensed pressure of air entering the engine is greater than a threshold value contained in an engine map stored in a memory of a controller of the engine.

16. The method of claim 14, further including removing constituents from the vented combustion gases and flow of exhaust mixed in the exhaust conduit.

17. The method of claim 14, further including sensing a pressure of the exhaust.

18. The method of claim 17, wherein the pressure of the air directed into the engine is increased based on the sensed parameter of the exhaust.

19. The method of claim 14, further including:
    cooling the air that is directed into the engine; and
    sensing the pressure of inlet air after it has been cooled.

* * * * *